Inventor
Donald S. Dence
By Walter E. Schirmer
Atty.

Inventor
Donald S. Dence

Patented Aug. 15, 1950

2,519,122

UNITED STATES PATENT OFFICE 2,519,122

TRANSMISSION LUBRICATING MEANS

Donald S. Dence, Buchanan, Mich., assignor to Clark Equipment Company, Buchanan, Mich., a corporation of Michigan Application December 21, 1946, Serial No. 717,742

10 Claims. (Cl. 184—11)

This invention relates to transmissions and is more particularly directed to a transmission for busses or similar vehicles in which the engine is mounted in the rear of the vehicle and the transmission is provided with an angle drive from the rear end of the transmission to the drive axle.

Transmissions of this general type have been made heretofore, but in the fabrication of such transmissions, difficulty has been encountered due to the fact that transmission cases had to be made in two parts requiring extremely accurate machining of the two portions of the transmission case in order to provide the necessary accuracy of location of the shafts and bearings, and also requiring difficult assemblying operations. Furthermore, with such type of transmissions as heretofore developed, it was also difficult to provide proper lubrication of gears and bearings due to the construction of the transmission case.

One object of the present invention is to provide an angle drive transmission in which the transmission case is formed as a unitary part whereby the machining can all be done on one integral piece providing for more accurate alinement of the shafts, gears and bearings, and eliminating the necessity of piloting one portion of the case upon the other which heretofore has been objectionable from both a machining standpoint and also from the standpoint of accuracy of design.

Another object of the present invention is to provide a transmission construction of this type in which the gears may be readily assembled into the main transmission unit, and in which the angle drive portion of the transmission may be assembled as a unit and inserted into the transmission case as a unitary sub-assembly.

Another advantage of the present invention is the provision of means in an angle drive transmission of this type for securing adequate lubrication of the bearings and gears disposed within the transmission.

A still further advantage of the present construction is to provide a compact angle drive transmission of unitary design which is easily assembled and in which the parts are located in proper alinement with respect to each other and the entire case can be machined accurately as a unitary assembly.

Other objects and advantages of the present invention will appear more fully from the following detailed description which, taken in conjunction with the accompanying drawings, will disclose to those skilled in the art, the particular construction and operation of a preferred form of the present invention.

Figure 1:
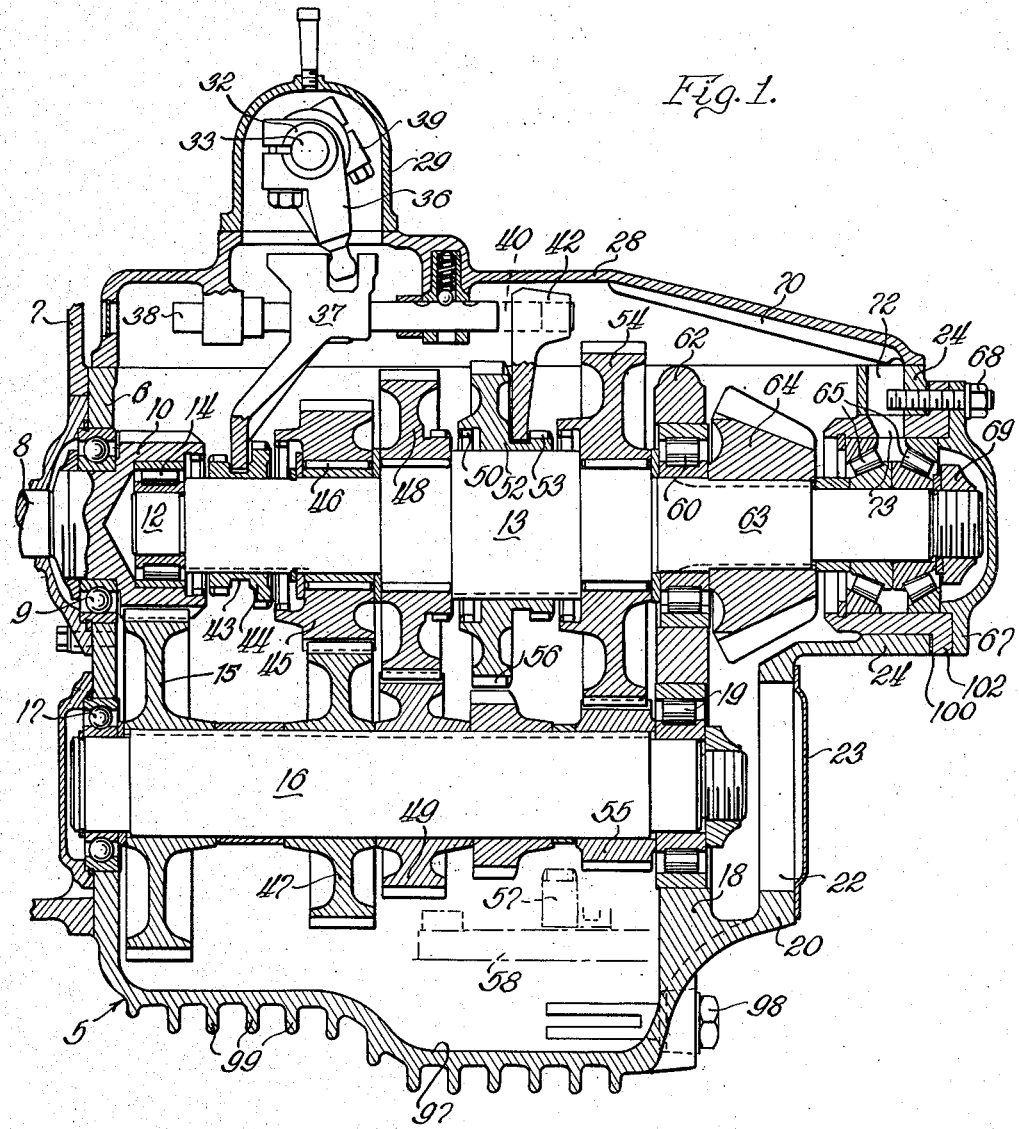
Figure 1 is a sectional view through the transmission construction.

Referring now in detail to the drawings, the transmission case is indicated generally at 5 and includes a forward end wall 6 adapted to be secured to the bell housing 7 which contains the clutch for the vehicle. The clutch driving shaft 8 extends through the wall 6 and is suitably journalled thereon by means of the bearings 9 and carries at its inner end, the enlarged drive pinion portion 10, which, in turn, is recessed to receive the reduced end 12 of the main shaft 13 of the transmission, this being journalled in the recesses by means of the roller bearings, 14.

The pinion gear 10 is adapted to have meshing engagement with gear 15 secured on the counter shaft 16, the forward end of this counter shaft being journalled at the wall 6 by means of the bearing assembly 17.

At its opposite end, the counter shaft is supported in a partition wall 18 of the transmission case 5, by means of the roller bearing assembly 19, whereby the shaft is journalled for rotation within the transmission housing. The housing 5 projects rearwardly beyond the partition wall 18, as indicated at 20, and is provided with the opening 22, closed by suitable cover member 23, which opening allows for assembly of the shaft 16 within the transmission.

Figure 2:
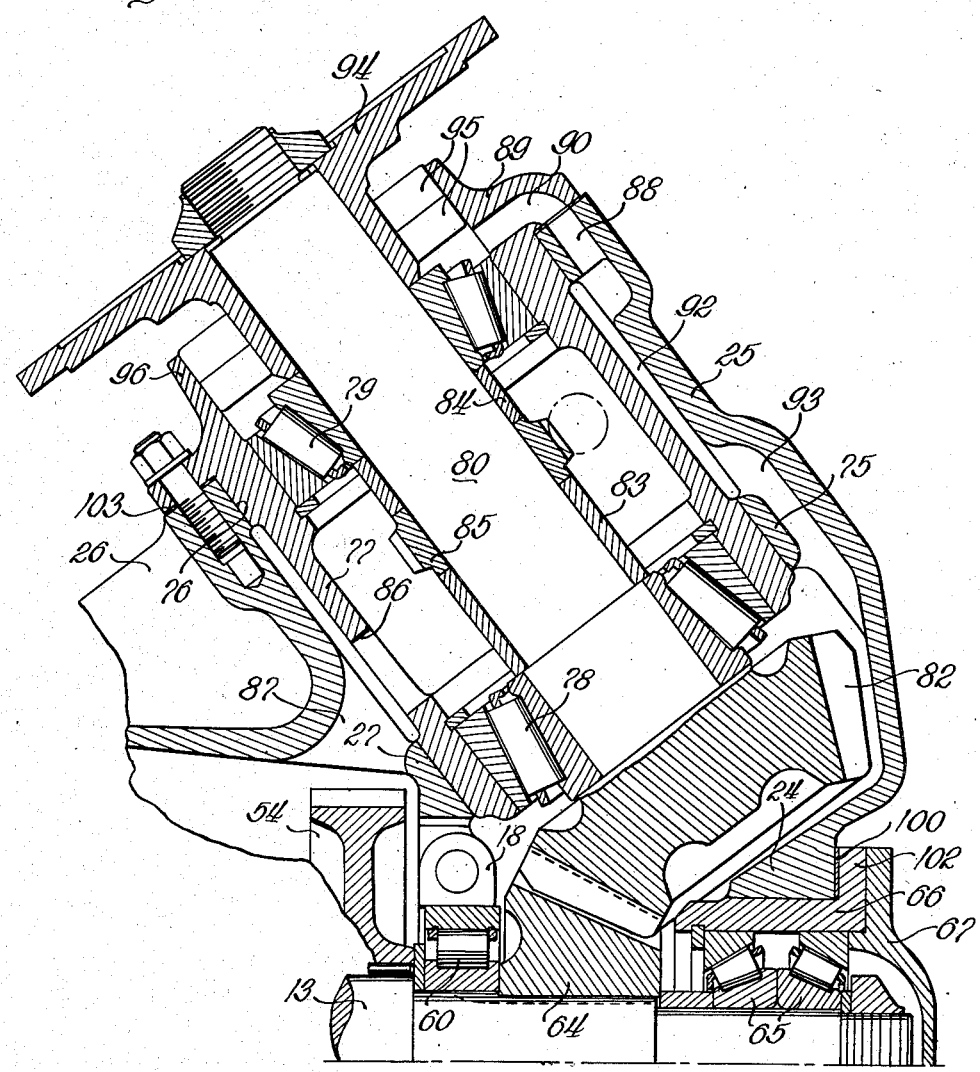
Figure 2 is a corresponding sectional view of the angle drive portion of the transmission.

The housing 5, beyond the portion 20 which defines the opening 22, is provided with a reduced annularly extending portion 24, which, in turn, includes an angularly projecting portion 25, shown in detail in Figure 2, formed integrally therewith, and joined to the side wall of the transmission through the ribbed portion 26, as clearly shown in Figure 2. In addition, the partition wall 18 also projects to a point indicated at 27 to form a support for the main drive pinion assembly which will be described in detail hereinafter.

Figure 3:
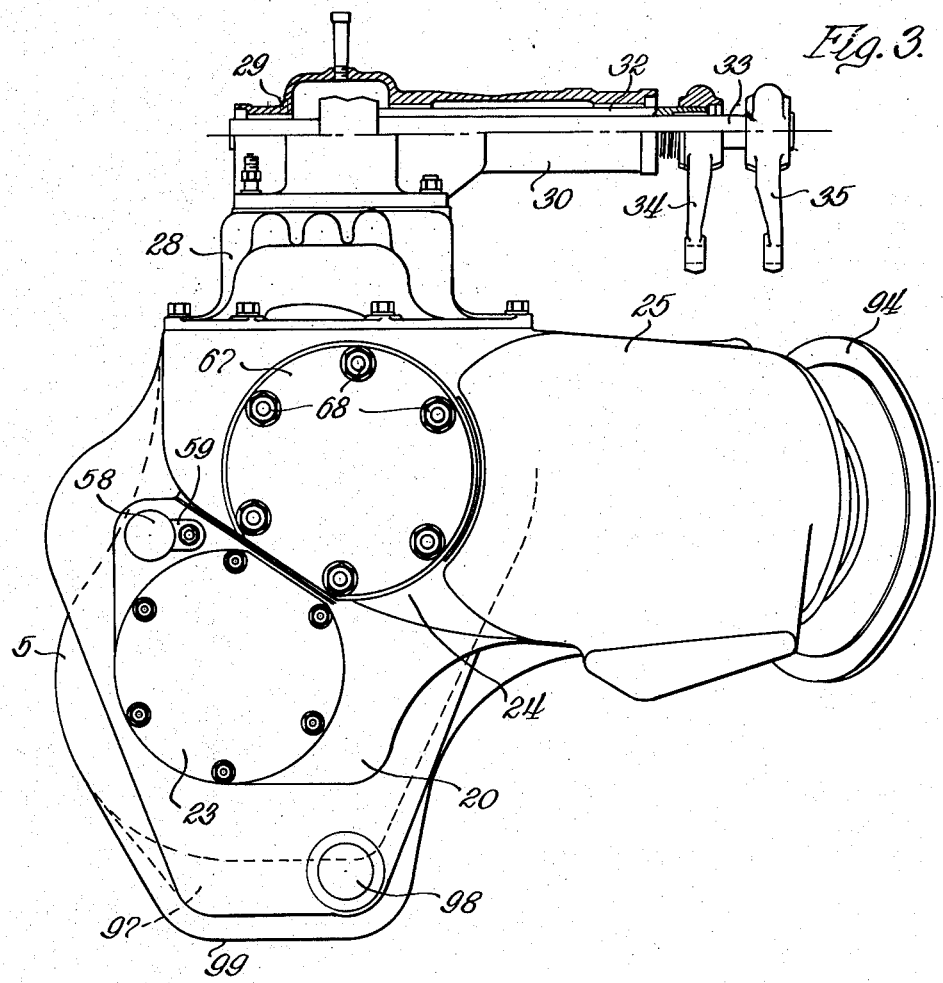
Figure 3 is an elevational view, partly in section, showing the unitary transmission case.
Figure 4:
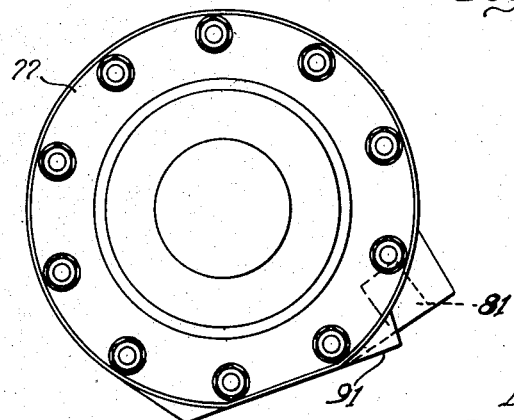
Figure 4 is a detail elevational view of the bearing cap for securing the angle drive assembly in position on the transmission case.

Mounted on the upper face of the housing 5 is a control cover member 28, carrying a control tower 29, which, as shown in Figure 3, extends laterally as indicated at 30 to rotate the control sleeve 32 and the control shaft 33, both journalled within the control tower 29 and carrying crank arms 34 and 35 respectively, at the projecting ends thereof. The sleeve 32, as shown in Figure 1, carries a shifter control arm 36 which has engagement in the shifter fork 37 mounted on the shift rail 38 carried within the control cover 28. The shaft 33 is provided with an actuating arm 39 engaging in a second shifter fork (not shown) mounted on the shift rail 40, which carries the shifter fork 42 for a purpose to be described in detail hereinafter.

The shifter fork 37 has a shift portion engaging in the collar 43 of a clutch member 44, which is splined on the shaft 12 and carries clutch teeth at opposite ends thereof adapted to mesh respectively with the pinion 10 or with the gear 45, rotatably mounted as by bearings 46 upon the shaft 13. Thus the shifter fork 37 is adapted to provide for direct clutching of the pinion 10 to the shaft 13 or the gear 45 to the shaft 13. The gear 45, in turn, has meshing engagement with a gear 47 mounted upon the counter shaft 16.

Mounted on the shaft 13, adjacent the gear 45, is a gear 48, having meshing engagement with the gear 49 carried by the counter shaft 16, and provided with clutch teeth adapted to be engaged by the clutch teeth 50 of a clutch member 52 adapted to be actuated by the shifter fork 42. The clutch member 52 is splined on the shaft 13 and, on its opposite end, carries clutch teeth 53 adapted to engage the clutch teeth of gear 54 rotatably journalled on the shaft 13, and in constant meshing engagement with a gear 55 non-rotatably secured to the countershaft. The clutch member itself, is provided with external gear teeth 56, which are adapted to have meshing engagement with an idler gear 57 carried on a lay shaft 58, this shaft being shown out of position in Figure 1, but being shown in its proper relative position in Figure 3. The lay shaft 58 extends through the rear wall of the transmission case 5 and is locked in position by means of the lock 59 secured to the rear wall of the transmission.

Thus it will be seen that four forward speeds and one reverse speed are provided in the transmission, the four forward speeds being produced by the meshing gear trains 10—15, and 54—55, when the gear 54 is clutched to the shaft 13 thus providing low speed. Similarly, when the gear 48 is clutched to the shaft 13, second speed drive is provided from the gears 10—15 through gears 49—48. With the clutch member 52 in neutral position and clutch member 44 engaging with the gear 45, third speed drive is provided from gears 10—15 through gears 47—45 to shaft 13 and direct drive is produced when the pinion 10 is clutched directly to the shaft 13 through the clutch member 43.

The shaft 13 is adapted to be supported intermediate its ends by the roller bearing assembly 60 which is supported in a split bearing portion of the partition wall 18. The split bearing includes an upper bearing bracket member 62 which may be removed during insertion of the shafts with its gears through the control cover and thereupon into the transmission end, and the member 62 is then bolted into position to hold the bearing 60 in place after the gear and shaft have been assembled. This prevents undue deflection of the shaft intermediate its ends during operation of the transmission.

The projecting portion of the shaft 13, indicated at 63, is splined to receive the bevel gear 64, which is thereby non-rotatably secured to this portion of the shaft. The shaft then projects outwardly through the cylindrical extension 24, and is supported by means of the double roller bearing assembly 65 carried by the sleeve 66, seated in the extension 24 and held in position by means of the cover member 67 and the studs 68. The outer end of the shaft is threaded to receive the retaining nut 69 for locking the bearing assembly in position.

Oil discharged up against the under surface of the cover plate 28, between gears 54 and 64, is adapted to drain rearwardly along the baffle 70 and through the opening 72 formed in the extension 24, and the corresponding alined opening 73 formed in the sleeve 66 and enters into the space between the bearings 65 for lubricating these bearings.

Extending at an angle of approximately 52° to the axis of the shaft 13, the integral tubular portion 25 of the housing 5 projects toward one side of the transmission case in a substantially horizontal plane and is adapted to have suitable boss portions 75 and 76 formed therein providing a guide for the supporting sleeve assembly 77 which contains the output drive pinion. The sleeve assembly 77 is thereby positioned by the bosses 75 and 76 within the extension 25 of the transmission housing and contains suitable tapered bearing assemblies 78 and 79 which are provided for rotatably supporting the pinion shaft 80 carrying the bevel gear pinion 82 at the inner end thereof.

Suitable spacing sleeves 83 and 84 provide proper spacing of the inner bearing races of the assembly 78 and 79 and intermediate the sleeves 83 and 84, there is provided the speedometer gear 85 adapted to mesh with a suitable speedometer output gear in a conventional manner, the speedometer cable extending through the opening 81. A suitable brake anchorage is provided on the bossed portion 91 of the extension 25 of the case. The sleeve 77 is interrupted, as indicated at 86, by an opening providing for flow of oil into the sleeve through the portion 87 of the transmission case, whereby oil from the gear 54 may be discharged through this opening and of course, may flow inside the sleeve 77 to provide adequate lubrication of the bearings 78 and 79.

In order to provide for return of oil passing through the bearing 79, the extension 25 of the housing is provided with an opening 88 formed therein, and the cover plate portion 89 of the sleeve 77 is cored, as indicated at 90, to provide communication with the opening 88. This provides for return of oil from the outer end of the bearing 79 through the passageway 90 and opening 88 into the annular space 92 between the sleeve 77 and the inner surface of the housing 25 intermediate the bosses 75 and 76. The housing 25 is also cored out as indicated at 93, to provide for flow of oil therethrough into the opening within which is disposed the pinion gear 82.

The shaft 80 is adapted to have mounted on the end thereof, the companion flange 94 of a universal joint assembly by which this shaft is connected to the propeller shaft leading to the drive axle, and suitable oil sealing means 95 is disposed about the hub of the flange 94 and within the open end of the cylindrical extension 96 of the sleeve 77 to prevent leakage of oil outwardly therethrough.

The transmission case 5 is provided with a depressed sump portion 97 disposed in the lower portion thereof, whereby all oil in the transmission case eventually drains into this sump portion. A suitable filter type drain plug 98 extends into the sump portion 97 for the purpose of draining the transmission case when such action becomes necessary. It will also be noted that the case is provided for cooling of the transmission case so as to prevent the oil from overheating.

Thus is will become apparent that I have provided a transmission of the angle drive type wherein there is a unitary transmission housing containing both the regular transmission elements and also the angle drive shaft and pinion by which the drive is transmitted from the transmission to the drive axle. This case is so designed as to provide ease of machining and insure accurate location of the various shafts and gears therein. Also a provision is made in the transmission case to allow cross lubrication of the bearings in the angle drive portion of the transmission as well as the bearings which are adjacent the bevel gears by which the angle drive is produced. The sleeve assembly 77, which carries the entire angle drive shaft and pinion assembly, can be removed out of the extension 25 without requiring dismantling of any other portion of the transmission.

The use of the bearing cap 62 provides for insertion of the entire main shaft assembly into position within the transmission through the control cover opening, and it is apparent that machining of the bearing surfaces can be processed by placing the cap member 62 in position during the machining operations.

Suitable shim members, indicated at 100, may be placed between the flange portion of the bushing and the end of the cylindrical extension 24 of the transmission case to provide for proper adjustment of the bevel gears. Similarly, the assembly of the shaft 80, within the sleeve 77, can be adjusted to provide proper meshing of gears 64 and 82 by providing shims indicated at 103 between the flange portion of sleeve 77 and the face of the extension 25 of the transmission case.

While I am aware that various changes may be made in certain details of the present construction without in any way departing from the underlying principles of the present invention, I do not intend to be limited except as defined by the scope and spirit of the appended claims.

I claim:

1. In an angle drive transmission having a main shaft, a first bevel gear adjacent the rear end of said main shaft, and a gear of a gear train on said main shaft forwardly of said first bevel gear, and a pinion shaft assembly extending angularly forwardly of said first bevel gear and including a pinion shaft having a second bevel gear fixed thereto having meshing engagement with said first bevel gear, the combination of a housing having a main body portion for housing said main shaft, said first bevel gear, and said gear of said gear train, main shaft supporting means including a partition extending transversely of said main body portion for supporting bearing means for said main shaft between said first bevel gear and said gear of said gear train, said housing having an angular extension portion for enclosing said pinion shaft assembly, said angular extension portion and said main body portion having a passage-way therebetween adjacent said gear of said gear train, sleeve means for supporting bearing means for said pinion shaft in said angular extension portion and communicating with the passageway between said angular extension portion and said main body portion for receiving lubricant discharged by said gear of said gear train to provide for lubricating the bearing means for said pinion shaft, and means defining lubricant passageway means extending from said sleeve to said main body portion for lubricating the bearing supported by said main shaft supporting means.

2. In an angle drive transmission having a main shaft, a first bevel gear adjacent the rear end of said main shaft, and a gear of a gear train on said main shaft forwardly of said first bevel gear, and a pinion shaft assembly extending angularly forwardly of said first bevel gear and including a pinion shaft having a second bevel gear fixed thereto having meshing engagement with said first bevel gear, the combination of a housing having a main body portion for housing said main shaft, said first bevel gear, and said gear of said gear train, and an angular extension portion for said housing for enclosing said pinion shaft assembly, said angular extension portion and said main body portion having a passageway therebetween adjacent said gear of said gear train, main shaft supporting means including a partition extending transversely of said main body portion for supporting bearing means for said main shaft between said first bevel gear and said gear of said gear train, sleeve means for supporting bearing means for said pinion shaft in said angular extension portion and communicating with the passageway between said angular extension portion and said main body portion for receiving lubricant discharged by said gear of said gear train to provide for lubricating of the bearing means for said pinion shaft.

3. In an angle drive transmission having a main shaft, a first bevel gear adjacent the rear end of said main shaft, and a gear of a gear train on said main shaft forwardly of said first bevel gear, and a pinion shaft assembly extending angularly forwardly of said first bevel gear and including a pinion shaft having a second bevel gear fixed thereto having meshing engagement with said first bevel gear, the combination of a housing having a main body portion for housing said main shaft, said first bevel gear, and said gear of said gear train, and an angular extension portion for said housing for enclosing said pinion shaft assembly, said angular extension portion and said main body portion having a passageway therebetween adjacent said gear of said gear train, main shaft supporting means including a partition extending transversely of said main body portion for supporting bearing means for said main shaft between said first bevel gear and said gear of said gear train, sleeve means for supporting bearing means for said pinion shaft in said angular extension portion and communicating with the passageway between said angular extension portion and said main body portion for receiving lubricant discharged by said gear of said gear train to provide for lubricating of the bearing means for said pinion shaft, and means defining a lubricant passageway means from said sleeve means to said main body portion providing for the return of lubricant from said sleeve means to said main body portion.

4. In an angle drive transmission having a main shaft, a first bevel gear adjacent the rear end of said main shaft, and a gear of a gear train on said main shaft forwardly of said first bevel gear, and a pinion shaft assembly extending angularly forwardly of said first bevel gear and including a pinion shaft having a second bevel gear fixed thereto having meshing engagement with said first bevel gear, the combination of a housing having a main body portion for housing said main shaft and including an integral rearwardly extending end portion in which said rear end of said main shaft and said first bevel gear are adapted to be disposed, main shaft supporting means including a partition extending transversely of said main body portion for supporting first bearing means for said main shaft between said first bevel gear and said gear of said gear train, said projecting end portion of said main body providing for supporting second bearing means for the end portion of said main shaft projecting rearwardly of said bevel gear, said housing having an angular extension portion for enclosing said pinion shaft assembly, said angular extension portion and said main body portion having a passageway therebetween adjacent said gear of said gear train, port means for conducting lubricant to said second bearing for said main shaft, baffle means for said housing for conducting lubricant thrown by said gear of said gear train thereagainst to said port means for lubricating said second bearing means for said main shaft, sleeve means for supporting bearing means for said pinion shaft in said angular extension portion, and communicating with the passageway between said angular extension and said main body portion for receiving lubricant discharged by said gear of said gear train to provide for lubrication of the bearing means for said pinion shaft, and means defining lubricant passageway means extending from said sleeve means to said main body portion for lubricating said first bearing means carried in said main shaft supporting means.

5. In an angle drive transmission having a housing including a main body portion for housing a main shaft having a first bevel gear thereon, the combination of an angular extension body portion extending forwardly of said main body portion from the end thereof enclosing said first bevel gear and open at its outer end, a sleeve adapted to be disposed in said angular extension portion, boss means for said angular extension housing for supporting said sleeve in spaced relation inwardly of the inner surface of said angular extension portion, a pinion shaft extending through said sleeve member and having a second bevel gear at the inner end thereof, bearing means between said pinion shaft and said sleeve for rotatably mounting said pinion shaft with said second bevel gear in meshing engagement with said first bevel gear, and means for detachably securing said sleeve in said angular extension portion whereby said sleeve, said pinion shaft, and said second bevel gear are adapted to be removed through the open end of said angular extension portion, a first opening between said angular extension portion and said main body portion, and said sleeve having an opening aligned with said first opening to receive lubricant from said main body portion for lubricating said bearing means for said pinion shaft.

6. The angle shaft assembly of claim 5 characterized by said bearing means comprising a pair of bearings one at each of the upper and lower ends of said pinion shaft, and in which the opening of said sleeve member is disposed between said pair of bearings, and passageway means extending from above the bearing means at the upper end of said pinion shaft and between the outer surface of said sleeve and the inner surface of said angular extension portion for conducting lubricant from the latter to the main body portion of the housing.

7. In an angle drive transmission having a main shaft, a first bevel gear carried adjacent the rear end of said main shaft, a gear on said main shaft forwardly of said first bevel gear, and a pinion shaft assembly extending angularly forwardly from said rear end of said main shaft, and including a pinion shaft having a second bevel gear fixed thereto having meshing engagement with said first bevel gear, the combination of a housing having a main body portion for housing said main shaft, said first bevel gear, and said gear on said main shaft, and an angular integral extension portion for housing said pinion shaft assembly, sleeve means for supporting bearing means for said pinion shaft in said angular extension portion, passageway means between said main body portion and said angular extension portion adjacent said gear on said main shaft, and said sleeve member having an opening aligned with said passageway for receiving lubricant thrown by said gear on said main shaft to provide for lubricating said bearing means for said pinion shaft.

8. The combination of claim 7 characterized by the provision of further passageway means for said angular extension portion for conducting lubricant from said sleeve to said bevel gears.

9. The combination of claim 7 characterized by the provision of bearing means for supporting the end of said main shaft adjacent said first bevel gear, and by the provision of further passageway means for said angular extension portion through which lubricant passes from said sleeve to said bearing means for said main shaft.

10. The combination of claim 7 characterized by the provision of second bearing means for journalling of the portion of said main shaft between the gear thereon and said first bevel gear, further passageway means for said angular extension portion through which lubricant passes from said sleeve to said second bearing means for said main shaft, third bearing means for journalling the rear end portion of said main shaft, port means for conducting lubricant to said third bearing means, and baffle means for said housing for conducting lubricant thrown by said gear on said main shaft there against to said port means for lubricating said third bearing means for said main shaft.

DONALD S. DENCE.

REFERENCES CITED

The following references are of record in the file of this patent:

UNITED STATES PATENTS

| Number | Name | Date |
| --- | --- | --- |
| 1,522,068 | Morgan | Jan. 6, 1925 |
| 1,820,201 | Simmons | Aug. 25, 1931 |
| 2,027,012 | Barnes | Jan. 7, 1936 |
| 2,033,246 | Keese | Mar. 10, 1936 |
| 2,054,782 | Day | Sept. 15, 1936 |
| 2,073,613 | Frudden et al. | Mar. 16, 1937 |
| 2,107,112 | Fawick | Feb. 1, 1938 |
| 2,230,604 | Ware | Feb. 4, 1941 |
| 2,244,225 | Strehlow | June 3, 1941 |
| 2,368,963 | Boden | Feb. 6, 1945 |
| 2,369,369 | Peterson | Feb. 13, 1945 |